United States Patent [19]

Slagel

[11] 3,866,242

[45] Feb. 18, 1975

[54] PROTECTIVE SHIELD

[75] Inventor: Edwin C. Slagel, Phoenix, Ariz.

[73] Assignee: Goodyear Aerospace Corp., Akron, Ohio

[22] Filed: Oct. 27, 1972

[21] Appl. No.: 301,544

[52] U.S. Cl............. 2/2.5, 89/36 A, 109/49.5, 161/165, 161/190, 161/404, 244/121, 296/78.1, 296/84 R, 260/75 NA, 260/77.5 AM
[51] Int. Cl............................. F41h 1/02, F41h 5/12
[58] Field of Search......... 161/165, 404, 190; 2/2.5; 220/63 A; 89/36 A, 36 L; 244/121, 129 W; 296/84 R, 78.1; 109/49.5; 260/75 NH, 77.5 AM

[56] References Cited
UNITED STATES PATENTS

| | | |
|---|---|---|
| 3,127,855 | 4/1964 | Conlon .......................... 109/49.5 |
| 3,369,836 | 2/1968 | Haycock ........................ 296/78.1 |
| 3,370,302 | 2/1968 | Karlyn ............................ 2/2.5 |
| 3,456,037 | 7/1969 | Hoeschele ..................... 260/858 |
| 3,600,358 | 8/1971 | Taub .............................. 260/75 NH |
| 3,620,905 | 11/1971 | Ahramjian ..................... 161/190 |

*Primary Examiner*—George F. Lesmes
*Assistant Examiner*—Ellis P. Robinson
*Attorney, Agent, or Firm*—F. W. Brunner; J. D. Wolfe

[57] ABSTRACT

A protective shield such as those used to shield a person from bullets or missiles, said protective shield consisting of polyurethane about one-fourth to three-fourths inches thick, shaped in the contour of a clipboard, windshield for a vehicle, face shield and related article.

6 Claims, 2 Drawing Figures

PATENTED FEB 18 1975

3,866,242

PROTECTIVE SHIELD

This invention relates to safety shields. More particularly, this invention relates to optical ballistic shields such as glazing for buildings and vehicles, riot shields, face masks and clipboards.

There has been need for optical type safety shields for some time which could be easily fabricated as a single, shaped member and without laminating several layers together.

An object of this invention is to provide a method of forming safety shields and related safety equipment.

Figure 1:
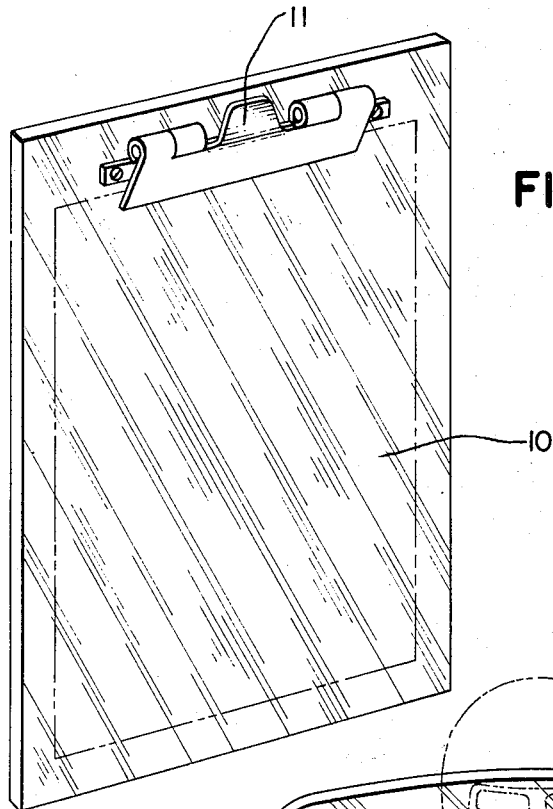
Figure 2:
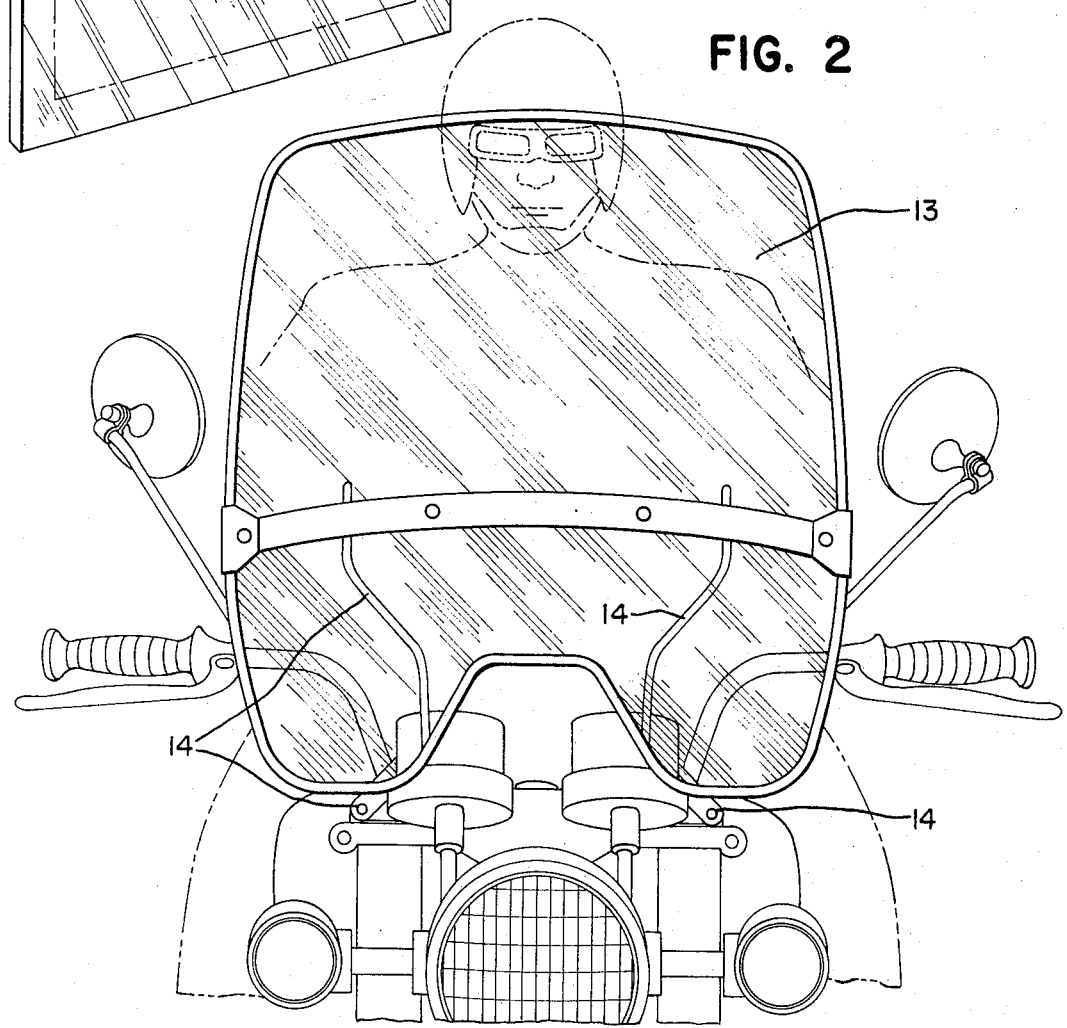

The object and advantages of this invention can more readily be appreciated and understood by reference to the drawings wherein FIG. 1 is a perspective view of a clipboard, and FIG. 2 is a perspective view of a windshield on a motorized vehicle.

Referring specifically to FIG. 1, numeral 10 indicates the clipboard base member with a clip member 11 fastened to the top of the base member with units 12 or other suitable fastening means. This clipboard, having a ballistic type polyurethane base member, can be used not only to hold notices or paper but also as a shield to protect a patrolman or other law enforcement officer from being shot while approaching a gunman in a stopped car. The clipboard base member is preferably about one-fourth to three-fourths inches thick, of any suitable width and length dimension.

Referring to FIG. 2, a windshield 13 of the contoured shape is mounted to a motor bike by mounting brackets 14 and the contoured windshield has sufficient optical clarity and ballistic resistance to serve as a safety shield where the windshield receives gun or rifle fire.

The optical glazing of this invention can be of any length and width dimensions but the thickness is to some extent a function of missiles to be stopped. For instance, about one-fourth to three-fourths inches has been found satisfactory for automobile windshields, side and back windows, face masks and riot shields, to mention only a few of the various safety shields.

The polyurethanes useful for making the base member of the safety shield are transparent with excellent optical clarity and with excellent ballistic properties.

The optically clear polyurethane of this invention can be prepared by reacting one equivalent of a polyester glycol or a polyether glycol having a molecular weight of about 700 to 1,000 with methylenebis (cyclohexyl isocyanate) to achieve an equivalent ratio of about 3 NCO to 1 OH, with the range being 2.7 to 4.5 NCO to 1 OH. The prepolymer is then reacted with 4,4'-methylenebis (2-chloroaniline) to achieve an equivalent ratio of 0.90 to 1.04 $NH_2/1.0$ NCO, with the preferred range being 0.96 to 99 $NH_2/1.0$ NCO.

Glycols which can be used to prepare the compositions of this invention include polyoxyalkylene ether glycols and polyester glycols. These glycols have number average molecular weights of about 700 to 1,000. Glycols having molecular weights of about 750 to 900 are especially effective in producing high quality polyurethanes.

Illustrative of suitable polyoxyalkylene ether glycols are poly-1,2-propylene ether glycol, poly-1,3 propylene ether glycol and polytetramethylene ether glycol. Polyoxyalkylene ether glycols useful in this invention can be prepared by condensing epoxides or other cyclic ethers as is well known in the art.

Representative polyesters useful in this invention include polycaprolactones and polyesters based on esterification of dicarboxylic acids of four to 10 carbon atoms, such as adipic, succinic and sebacic acids, and low molecular weight glycols of two to eight carbon atoms such as ethylene glycol, propylene glycol, diethylene glycol, 1,4-butanediol and 1,6-hexanediol. The polycaprolactones are prepared by condensing caprolactone in the presence of difunctional active hydrogen compounds such as water or the above enumerated low molecular weight glycols. Polyesters obtained by esterification of dicarboxylic acids and glycols can be derived by well-known esterification or transesterification procedures. The preferred materials for this invention are the polycaprolactones of the glycols of two to 10 carbon atoms.

The isocyanates used in the preparation of the compositions of this invention are diisocyanatodicyclohexylmethanes and preferably mixtures thereof containing from about 10–100 percent of the trans-transisomer of 4,4'-methylenebis (cyclohexyl isocyanate), also hereinafter referred to as "PICM." Other components usually present in the mixtures of position and/or stereoisomers of the diisocyanato-dicyclohexylmethane used in this invention are the cis-trans and cis-cis isomers of PICM and stereoisomers of 2,4'-methylenebis-(cyclohexyl isocyanate). These, as well as the trans-trans PICM isomer, are present in amounts which can be controlled by the procedures used to prepare the diisocyanato-dicyclohexylmethane. Preferred diisocyanates are isomeric PICM mixtures which are liquid at 25° C. or less. Such liquid PICM's contain less than about 26 percent trans-trans-isomer and less than about 72 percent cis-cis-isomer. An especially preferred mixture contains the trans-trans, cis-trans and cis-cis-isomers of PICM in a weight ratio of about 20:65:15 and optionally small amounts up to about 5 percent by weight of 2,4'-methylenebis (cyclohexyl isocyanate). These preferred mixtures can be conveniently handled and give high-quality polyurethanes.

The PICM used in this invention is prepared by phosgenating the corresponding 4,4'-methylenebis (cyclohexyl amine) (PACM) by procedures well known in the art, of U.S. Pat. Nos. 2,644,007, 2,680,127 and 2,908,703. The PACM isomer mixtures which upon phosgenation yield PICM that is a liquid at room temperature are also well known in the art, and can be obtained by hydrogenation of methylenedianiline under mild conditions and/or by fractional crystallization of PACM isomer mixtures in the presence of water and alcohols such as methanol and ethanol.

The amine curing agents used in this invention have only primary amine groups. The preferred amines are characterized by having a methylene bridge between two aromatic rings such as phenyl rings, but differ in ring substitution, and the benzidine series which differ only in ring substitution, the preferred amine being 4,4'-methylene bis (2-chloroaniline).

The polymers of this invention can be prepared by one shot, quasi-prepolymer or full prepolymer methods, all of which are well known in the art. The polymer of this invention can be cast, compression molded, extruded and injection molded. For optical safety shield parts, casting is the preferred method.

Preferred polymers for making the safety shield are prepared from E-caprolactone/hexanediol having a molecular weight of about 850 and 4,4'-methylenebis (cyclohexyl isocyanate) containing about 20 percent trans-trans-isomer, 65 percent cis-trans-isomer and 15 percent cis-cis-isomer PICM. The ratio of NCO groups to OH groups is about 3.0/1.0.

In the following examples all parts are by equivalent weight or weight percent unless otherwise indicated. These examples are illustrative and representative of the various embodiments of this invention.

EXAMPLE I

To 396 parts of 4,4'-methylenebis (cyclohexyl isocyanate) PICM, 425 parts of E-caprolactone hexanediol polyester was added. The mixture was agitated under a dry $N_2$ blanket and heated to 205° F. at which time the heat source was removed. The exotherm was not allowed to exceed 240° F. This prepolymer was then reacted with 4,4'-methylenebis (2-chloroaniline) at a ratio of 1.0 NCO to 0.98 $NH_2$ groups, cast between glass plates coated with a dimethyl dichlorosilane as a mold release so as to produce a clipboard base member .400 inch × 12 inches × 12 inches, and cured at 275° F. for 9 hours. The cured polymer exhibits the following properties:

| | |
|---|---|
| Light transmittance | 83% |
| Haze | 0.9% |
| Gardner Color | 6 |
| Tensile psi | 6500–7500 |
| Tensile Modulus | 200,000 |
| Elongation % | 100–150 |
| Hardness Shore "D" | 77–80 |
| Flammability (Federal Test Method No. 404, Method 2021) | Non-burning |

Four holes were bored in the clipboard base member and a clip member riveted to the base member to give a clipboard. This clipboard was satisfactory for use by police patrolmen and could be used as a clear bullet shield while accosting a stopped automobile or other vehicle.

EXAMPLE II

To the recipe of Example I was added 2 percent Tinuvin 328 based on the prepolymer weight, cast and cured in the same manner. The cured polymer exhibits the following properties:

| | |
|---|---|
| Light transmittance | 83% |
| Haze | 0.9% |
| Gardner Color | 6 |
| Tensile psi | 6500–7500 |
| Tensile Modulus psi | 200,000 |
| Elongation % | 100–150 |
| Hardness Shore "D" | 77–80 |
| 1000 hour accelerated ultraviolet exposure | 7 |
| 2000 hour accelerated ultraviolet exposure | 7+ |
| 6 months outdoor weathering, Phoenix, Arizona | 8 |

The ballistic properties of the formulation were not affected by the accelerated exposure or the outdoor exposure. The samples (.400 inch × 12 inches × 12 inches) were evaluated using 22 long rifle, high speed 40 grain projectiles fired from a semi-automatic pistol and .45 caliber 230 grain metal case projectiles fired from a 45 colt semi-automatic pistol. The test sample was secured in the test frame, the samples were fired at 90° obliquity at a distance of 2 feet, one 45 round followed by five 22 rounds at both 75° F. and 100° F. The sample passed the test criterion as there was no penetration or cracking of the test sample.

Other polyurethanes suitable for use in this invention are those described in applicant's copending application Ser. No. 116,287, filed Feb. 17, 1971.

While certain representative embodiments and details have been shown for the purpose of illustrating the invention, it will be apparent to those skilled in this art that various changes and modifications may be made therein without departing from the spirit or scope of the invention.

What is claimed is:

1. A safety shield consisting essentially of an optically clear polyurethane of about one-fourth to three-fourth inch thick, shaped in the contour of a shield and capable of stopping a 0.45 caliber 230 grain metal projectile fired at 90° obliquity at a distance of 2 feet from the shield, said polyurethane comprising the reaction product of (a) a polyurethane prepolymer prepared from either a polyether glycol or polyester glycol of about 700 to 1,000 molecular weight with methylene bis(cyclohexyl isocyanate) in the equivalent ratio of 2.7 to 4.5 NCO to each hydroxyl and (b) an aromatic amine curing agent having a methylene bridge between two aromatic rings to achieve an equivalent ratio of 0.90 to 1.04 $NH_2/1.0$ NCO.

2. The safety shield of claim 1 wherein the contour of the shield is that of a glazing for a bullet stopping viewing member.

3. The safety shield of claim 1 wherein the contour of the shield is that of a windshield for a vehicle.

4. The safety shield of claim 1 wherein the contour of the shield is that of a clipboard.

5. The safety shield of claim 1 wherein the clipboard has a clip for holding papers.

6. The safety shield of claim 1 wherein the shield has the contour of a face mask.

* * * * *